United States Patent [19]

Concha et al.

[11] Patent Number: 5,043,879

[45] Date of Patent: Aug. 27, 1991

[54] PLA MICROCODE CONTROLLER

[75] Inventors: Fernando Concha, Boca Raton; John M. Loffredo, Deerfield Beach, both of Fla.

[73] Assignee: International Business Machines Corporation, Armonk, N.Y.

[21] Appl. No.: 296,168

[22] Filed: Jan. 12, 1989

[51] Int. Cl.⁵ .................................................. G06F 1/00
[52] U.S. Cl. .................................... 364/200; 364/900
[58] Field of Search .............................. 364/200, 900

[56] References Cited

U.S. PATENT DOCUMENTS

| | | |
|---|---|---|
| 3,614,740 | 10/1971 | Delagi et al. . |
| 3,736,567 | 5/1973 | Lotan et al. . |
| 3,794,980 | 2/1974 | Cogar et al. . |
| 3,959,774 | 5/1976 | Mead .................................. 364/200 |
| 4,156,900 | 5/1979 | Gruno et al. . |
| 4,254,461 | 3/1981 | Chemla et al. . |
| 4,323,963 | 4/1982 | Wu . |
| 4,371,931 | 2/1983 | Catiller et al. . |
| 4,394,736 | 7/1983 | Bernstein et al. . |
| 4,398,244 | 8/1983 | Chu et al. . |
| 4,399,505 | 8/1983 | Druke et al. . |
| 4,438,492 | 5/1984 | Harmon, Jr. et al. . |
| 4,450,525 | 5/1984 | Demuth et al. . |
| 4,459,657 | 7/1984 | Murao . |
| 4,488,227 | 12/1984 | Miu et al. . |
| 4,493,029 | 1/1985 | Thierbach . |
| 4,504,904 | 3/1985 | Moore ................................ 364/200 |
| 4,509,114 | 4/1985 | Leininger et al. .................. 364/200 |
| 4,546,431 | 10/1985 | Horvath . |
| 4,551,798 | 11/1985 | Horvath . |
| 4,556,938 | 12/1985 | Parker et al. . |
| 4,562,538 | 12/1985 | Berenbaum et al. ................ 364/200 |
| 4,575,794 | 3/1986 | Veneski et al. ..................... 364/200 |
| 4,594,661 | 6/1986 | Moore et al. ....................... 364/200 |
| 4,685,080 | 8/1987 | Rhodes, Jr. et al. ............... 364/900 |
| 4,947,369 | 8/1990 | Thoma et al. ...................... 364/900 |

OTHER PUBLICATIONS

IBM Technical Disclosure Bulletin: Digital Sample Instruction by D. E. Sibbers, vol. 21, No. 10, Mar. 1979.
IBM Technical Disclosure Bulletin: Microprocessor-Based Programming Panel for Field Programmable Logic Array by G. T. Davis, vol. 20, No. 12, May 1978.
IBM Technical Disclosure Bulletin: Optical Character Recognition with Programmable Logic Arrays by N. F. Brickman, vol. 18, No. 5, Oct. 1975.
IBM Technical Disclosure Bulletin: Wiring Machine by M. M. Denneau and R. Nair, vol. 24, No. 11A, Apr. 1982.
IBM Technical Disclosure Bulletin: Hybrid Microprocessor by R. F. Boehm, V. A. Detar, H. E. Frassetto, W. E. Houck and H. T. Ward, vol. 16, No. 12, May 1974.
Article Entitled: Method for Direct Multiway Branching in Microprogram Control by C. A. Papachristou, Jul. 2, 1981 in "Electronics Letters".

Primary Examiner—Douglas W. Olms
Assistant Examiner—T. Samuel
Attorney, Agent, or Firm—Bernard D. Bogdon

[57] ABSTRACT

To provide for efficient use of computer microcodes, a firmware structure containing a mainline programmable logic array circuit and at least one subroutine programmable logic array circuit may be used. As the states of the mainline programmable logic array circuit are sequenced, the data bits representing the encode number field in its OR array are compared with the data bits representing the encode number field of the AND array of the subroutine programmable logic array circuit. If a match is made, the mainline programmable logic array circuit suspends its operation and sequencing of the subroutine programmable logic array circuit begins, in order to perform the function required. Upon completion of the function, control is automatically transferred from the subroutine programmable logic array circuit back to the mainline programmable logic array circuit, at the point where it was suspended. By nesting a plurality of subroutine programmable logic array circuits, a plurality of functions, many of which may be performed simultaneously, can take place.

15 Claims, 6 Drawing Sheets

PLA MICROCODE CONTROLLER

FIELD OF THE INVENTION

This invention relates to microcode control apparatus for use in microprogrammed data processors and digital computers wherein a sequence of microwords is used to control the execution of each of the processor instructions.

BACKGROUND OF THE INVENTION

In a microprogrammed data processor, microwords, or microinstructions, are read from an internal storage unit to provide internal processor control actions for executing the processor instructions obtained from a user's software program. The microwords are read from the storage unit and written to a control register one at a time. Each microword consists of multiple binary bits, some or all of which may be organized into pluralbit control groups or fields. The control register provides control point signals which, in turn, control the various data flow rate and data manipulation mechanisms within the data processor, with each microword controlling the internal operation of the data processor for one microword cycle. Several microwords are usually needed to execute each processor instruction. Some processor instructions require only a few microwords, while others require many.

The microwords may be located in a separate so called "control storage" unit, or they may be located in a portion of the processor's main memory set aside for the exclusive use of the microwords. Furthermore, microwords may also be stored in read only storage units (ROS).

Alternatively, the control storage unit and its associated addressing circuitry can be replaced by a programmable logic array (PLA), working in conjunction with a sequence counter. The PLA is driven by an operation code portion of the processor instruction and a particular sequence count from the sequence counter for producing a particular microword at its output. Such a PLA and sequence counter combination is able to provide significant savings in the size of the real estate (in terms of the area within the data processor) required—when the PLA is compared to the conventional storage unit. If a desired number of repetitions for a certain microcode is needed, a fixed capacity repeat counter for counting the number of microcode loops in order to terminate the looping action at a certain count is also required. For different types of processor instructions where the number of microcode loops are different, a different number of fixed capacity repeat counters may also be needed, thereby further burdening the data processor.

U.S. Pat. No. 4,556,938 (incorporated herein by reference to this application) discloses the use of a programmable repeat counter which can be loaded with different initial count values for different processor instructions, in order to provide different numbers of repeats for the different microcode loops needed for the different instructions. Although such an arrangement is able to reduce the amount of circuitry needed in those situations where microcode looping is provided for two or more different processor instructions, the fact remains that—when working in concert with the programmable repeat counter—the PLA can only generate one microword at a time. In other words, if an instruction requires the execution of a given action X number of times, the PLA needs to repeat all of the operations preceding (or following) this action the same X number of times in order to bring about this action, notwithstanding the fact that quite a few of these operations may not be necessary and in fact may actually take up valuable time. This necessarily leads to crude and inefficient processing of the computer microcode, thereby resulting in the unnecessary implementation of an excessive number of product terms (lines of microcode) to perform each job.

SUMMARY OF THE INVENTION

This invention allows efficient usage of computer microcode by configuring a logic array (PLA), which is referred to as a "mainline" PLA, to effectively incorporate a firmware subroutining mechanism into the data processor.

The mainline PLA, in controlling the subroutine PLAs, utilizes an encoded number, in the form of a multiple number of data bits, provided from its output partition (OR array) to the input partition (AND array) of the subroutine PLA(s) it is addressing. The addressed subroutine PLA becomes operative if the encoded number data bits from the mainline PLA match predetermined data bits in its encoded number field. At that point, the mainline PLA goes into a state of suspension (although control point signals are still being output therefrom), while the states (i.e. the addresses) of the addressed subroutine PLA are incremented to perform the operation it is preprogrammed for. The subroutine PLA continues to implement the operation and provide as its output the necessary control points, until it has been incremented by its corresponding sequence counter into a state whereby it is informed that the operation no longer needs to be implemented (or that the operation is finished). At that time, a data bit is sent from the subroutine PLA to the mainline PLA for automatically reinitializing, or reinstating, the incrementation of the mainline PLA.

As the mainline PLA is again incremented, different subroutine PLAs, which can perform different operations, can be addressed by the mainline PLA. These additional subroutine PLAs can be positioned, relative to the mainline PLA, at different levels. Moreover, an unlimited number of subroutine PLAs can be nested together such that a plurality of different levels of subroutine PLAs can be commanded by the same mainline PLA for performing different operations, at the same or different times via different subroutines.

It is therefore an objective of the present invention to provide a microcode control mechanism which uses computer microcodes efficiently by performing subroutine actions in PLAs similar to software subroutining.

Another objective and advantage provided by the present invention is the automatic branching back to the point in the mainline PLA where the subroutine PLA was addressed, after the operation performed by the subroutine PLA has been completed, and without using any kind of address return "save" mechanism.

Additional advantages of the present invention reside in the reduction of the PLA size and the improved performance that is achieved.

The above-mentioned objectives and advantages of the present invention will become more apparent and the invention itself will be best understood by reference to the following description of the invention taken in conjunction with the accompanying drawings, wherein:

DETAILED DESCRIPTION OF THE INVENTION

Figure 1:
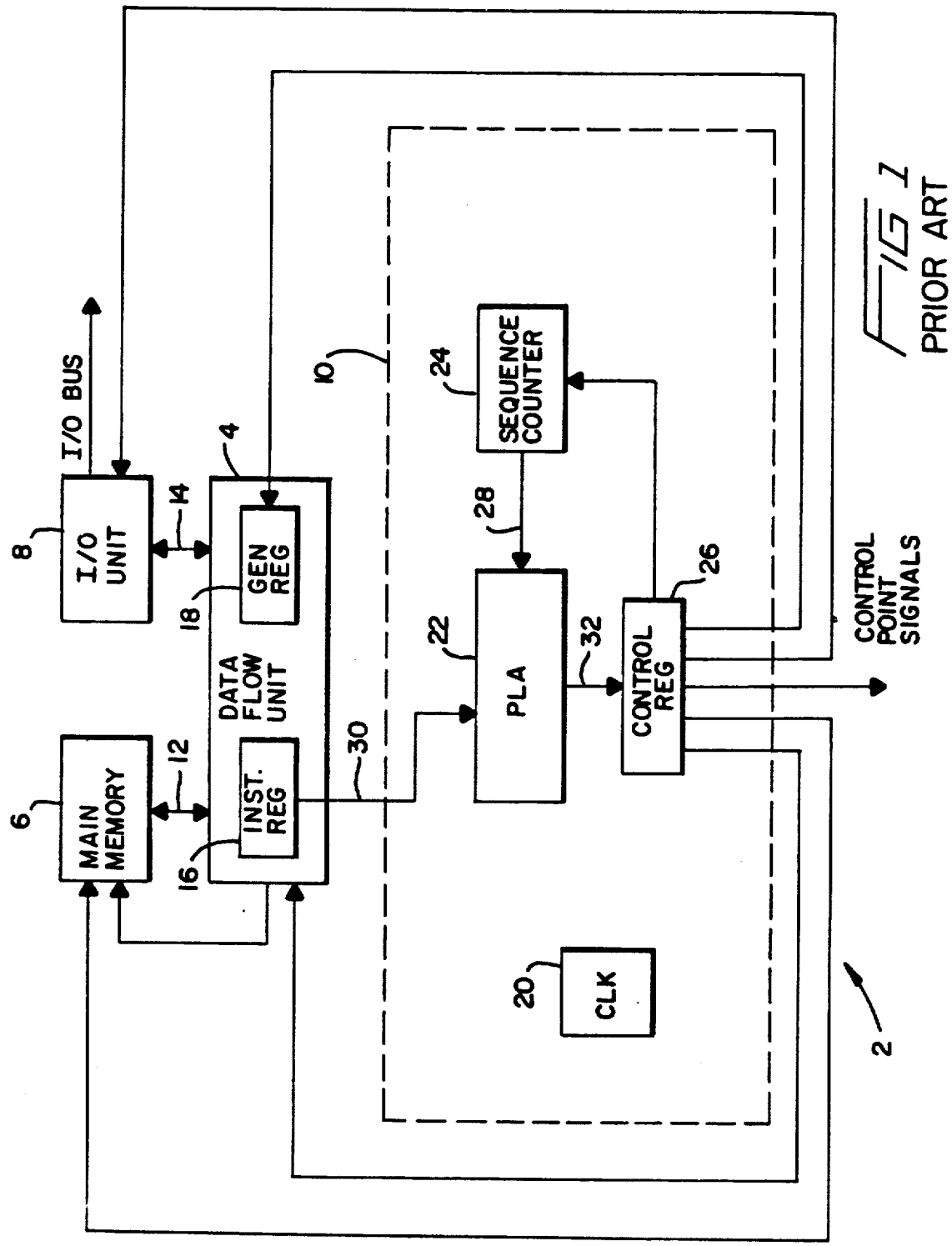
FIG. 1 is a functional block diagram of a prior art data processor that utilizes a PLA.

FIG. 1 shows a broad overview of a prior art data processor. Data processor 2 includes a data flow unit 4, a main memory 6, an input/output unit 8 and a simplified control unit 10. Data flow unit 4 may oftentimes be referred to as a central processing unit (CPU) and may include such things as an arithmetic logic unit (ALU), various hardware registers, storage units and a bus system interconnecting the different units for controlling the movement of data between the same. In essence, data flow unit 4 performs the actual manipulation of data to produce the desired results. In addition, by means of data buses 12 and 14, data flow unit 4 is connected to main memory 6 and I/0 unit 8, respectively, for transporting information to and from these units.

The software program, or user program, containing the instructions to be executed, is loaded into main memory 6. The processor instructions contained within the user program are read out of main memory 6 and supplied to data flow unit 4, one at a time and in a sequential manner, for performing the desired operations. As shown, data flow unit 4 includes a plural-bit instruction register 16 and a general register 18. Instruction register 16 is used by data flow unit 4 for storing each of the processor instructions that needs to be executed. Conventionally, either the complete processor instruction or a portion thereof is loaded into instruction register 16. No matter which format is used, however, the portion of the processor instruction that contains the operation code is loaded into instruction register 16. The operation code, of course, is defined as all of the bits in the processor instruction which are needed to uniquely define the kind of operation to be performed by data processor 2.

General register 18 is a general purpose register which is used to temporarily store the calculated data values and other values such as address values during the performance of a program. Although only one general register is shown, in actuality, a data flow unit may contain a plurality of general registers.

In the data processor defined in FIG. 1, control unit 10, which controls the operation of data flow unit 4, main memory 6 and I/0 unit 8, is shown to have a clock 20, a programmable logic array circuit (PLA) 22, a sequence counter 24 and a control register 26. For sake of simplicity many other components which ordinarily reside in control unit 10 but which are not needed for understanding of this invention are not shown.

Control unit 10 is a microprogrammed type unit which uses PLA 22 and sequence counter 24. As is well known, a PLA is defined as a fixed, orderly structure of logic circuits that can be personalized to implement a specific set of logic equations. Typically, a PLA includes an input AND array (or input partition) connected by a large number of product terms (or lines of microcode) to an output OR array (or output partition). All of the structures for a PLA, which may be of the static or dynamic type, are fabricated on a single integrated circuit chip. For this discussion, it may be assumed that PLA 22 is static.

Sequence counter 24 is a plural-bit binary counter for supplying plural-bit binary number signals, by means of bus 28, to PLA 22 for incrementing the states (or addresses) of the same. The timing of the different components are controlled by clock 20 whose outputs, for sake of simplicity, are not shown. Control register 26 is a plural-bit register which, when in receipt of an output, i.e. a microword from PLA 22, deciphers the same and routes a signal corresponding to the output to the different components for further processing. Although ordinarily a decoder is needed for deciphering a microword, none is shown in FIG. 1, again for the sake of simplicity.

When a processor instruction is loaded into instruction register 16 from main memory 6, the operation code portion of the processor instruction is fed, by bus 30, to PLA 22. In response to this operation code on bus 30 and a particular sequence count on bus 28 from sequence counter 24, PLA 22 produces, as an output, a particular plural-bit microword which may be defined as a microinstruction or output signal that, either by itself or with some other control signals, is used to perform a certain function. It should be noted that the to-be-performed function may be predetermined for each PLA. Although not shown in FIG. 1, the operation code from bus 30 is fed to the AND array (AND partition) portion of PLA 22, while the output from PLA 22 onto bus 32 to control register 26 is provided by the OR array (OR partition) portion of PLA 22.

Upon receipt of the output signal on bus 32, control register 26 can route the output, as control point signals, to various components. Although, in actuality, a microword is output from control register 26, for this discussion, the outputs from control register 26 are considered as control point signals for performing a particular function.

When given an operation code, PLA 22 produces a sequence of microwords, each microword being produced by one count in accordance with the timing from sequence counter 24. Thus, irrespective of whether or not all of the microwords in a sequence are needed for a particular operation, a sequence of microwords is generated. Moreover, if the particular operation has to be repeated, the same operation code has to be fed to PLA 22 repeatedly. Therefore, the size of the PLA required for performing the different operation codes remains relatively large. Furthermore, such operation has been found to be quite inefficient, despite the fact that circuitries, such as repeat circuitry for reducing the number of microwords needed in PLA 22 already are being used in control circuit 10.

Figure 2:
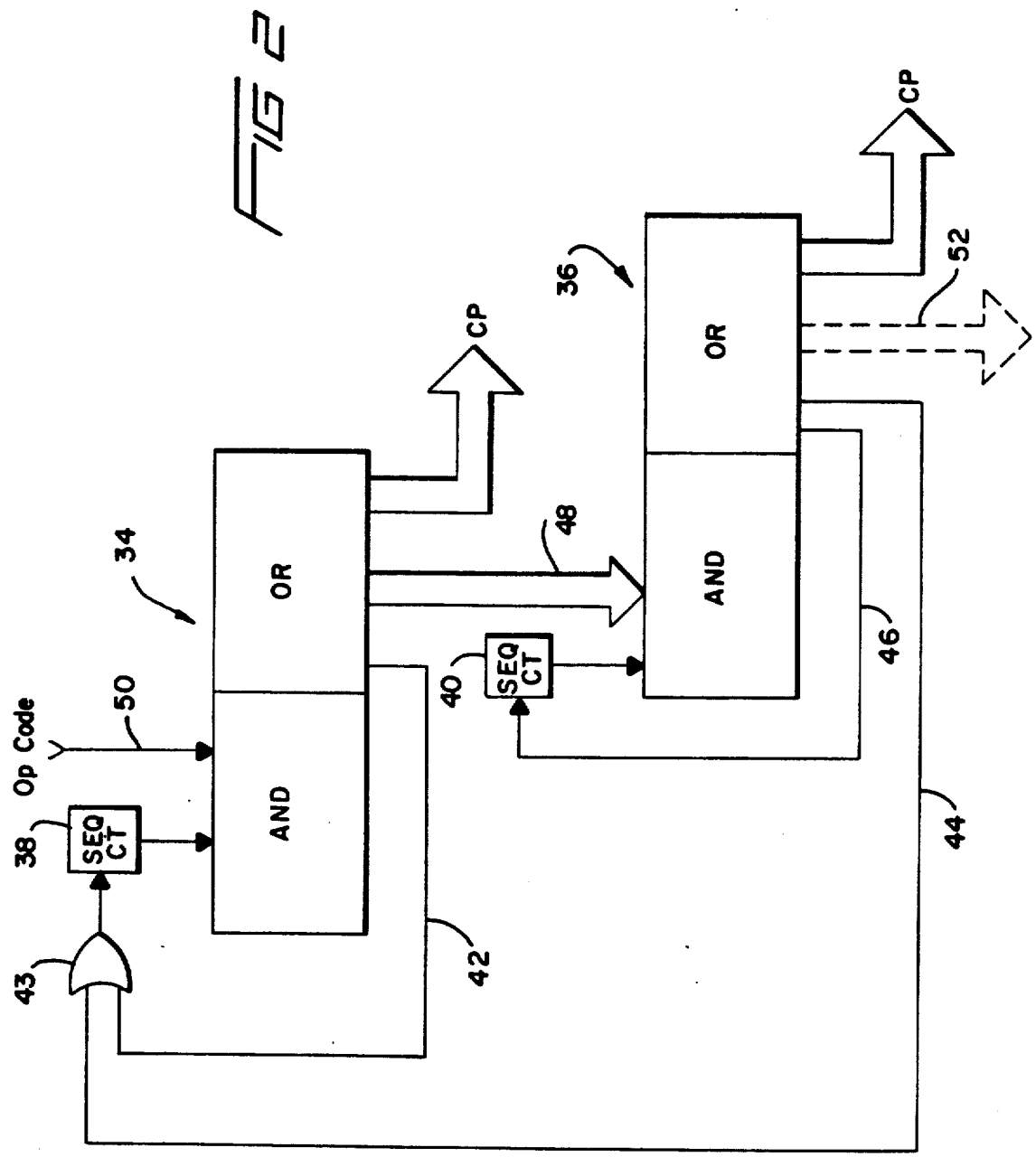
FIG. 2 is a functional block diagram of the present invention showing only a mainline PLA and a subroutine PLA.

To eliminate this inefficiency and the relatively large size of the PLA, the present invention, as shown in the embodiment of FIG. 2, replaces the single PLA 22 of FIG. 1 with a mainline PLA 34 interconnected with at least one other PLA, such as a subroutine PLA 36. Each of the PLAs shown in FIG. 2 has an AND array and an OR array, and each of the PLAs has its own corresponding sequence counter—sequence counter 38 for PLA 34 and sequence counter 40 for PLA 36. Mainline PLA 34 is incremented by a control bit from its OR array, shown routed by bus 42, to sequence counter 38 and fed as an input to the AND array. Mainline PLA 34 is also being incremented, by a control bit from subroutine PLA 36, more specifically, from the OR array thereof and fed via line 44 to sequence counter 38. The control bits from the respective OR arrays of PLAs 34 and 36 are gated by an OR gate 43, before being fed to sequence counter 38.

Subroutine PLA 36 is incremented, via sequence counter 40, by a control bit from its OR array sent through line 46. In addition, a plural-bit encode number (in the form of plural-bits), sent from the OR array of mainline PLA 34 via bus 48, is also used to address subroutine PLA 36. Each of the OR arrays of the respective PLAs has an additional output, designated CP, for providing control points as output signals to perform particular function(s) associated with a given operation code. Such an operation code can be seen as being input to the AND array of mainlines PLA 34 from line 50. Further shown as a possible output for the OR array of subroutine PLA 36 is a bus 52 which may be used to provide data bits representing the encode numbers from subroutine PLA 36 to other subroutine PLAs. This nested feature of one subroutine PLA being connected to another will be discussed later in this application.

With the structure shown in the embodiment of FIG. 2, an automatic branch, for performing different operations, may be effected with the same operation code. For example, if an operation code were to have generated a sequence of different microwords (for corresponding functions), as was sequentially done by the same PLA in the prior art, the present invention can actually use a single PLA for generating individually each of the microwords. And when the corresponding functions are done, a branching back from the subroutine PLA(s) to the mainline PLA is automatically effected. Hence, the subroutine PLA may be used repeatedly to perform the same function such that each time that function is finished, an automatic branching back to the part of the processor instruction which requires the execution of that particular function can be effected, without having to have special hardware or having to actually execute the same processor instruction repeatedly. In effect, the embodiment of FIG. 2 is executing a "firmware" subroutining, which is much less expensive than software subroutining, conventional circuitries or read only storage (ROS), which are much more expensive, ie. greater power consumption and more silicon use or "real-estate" required, than PLAs and require more real estate in the data processor.

Figure 3:
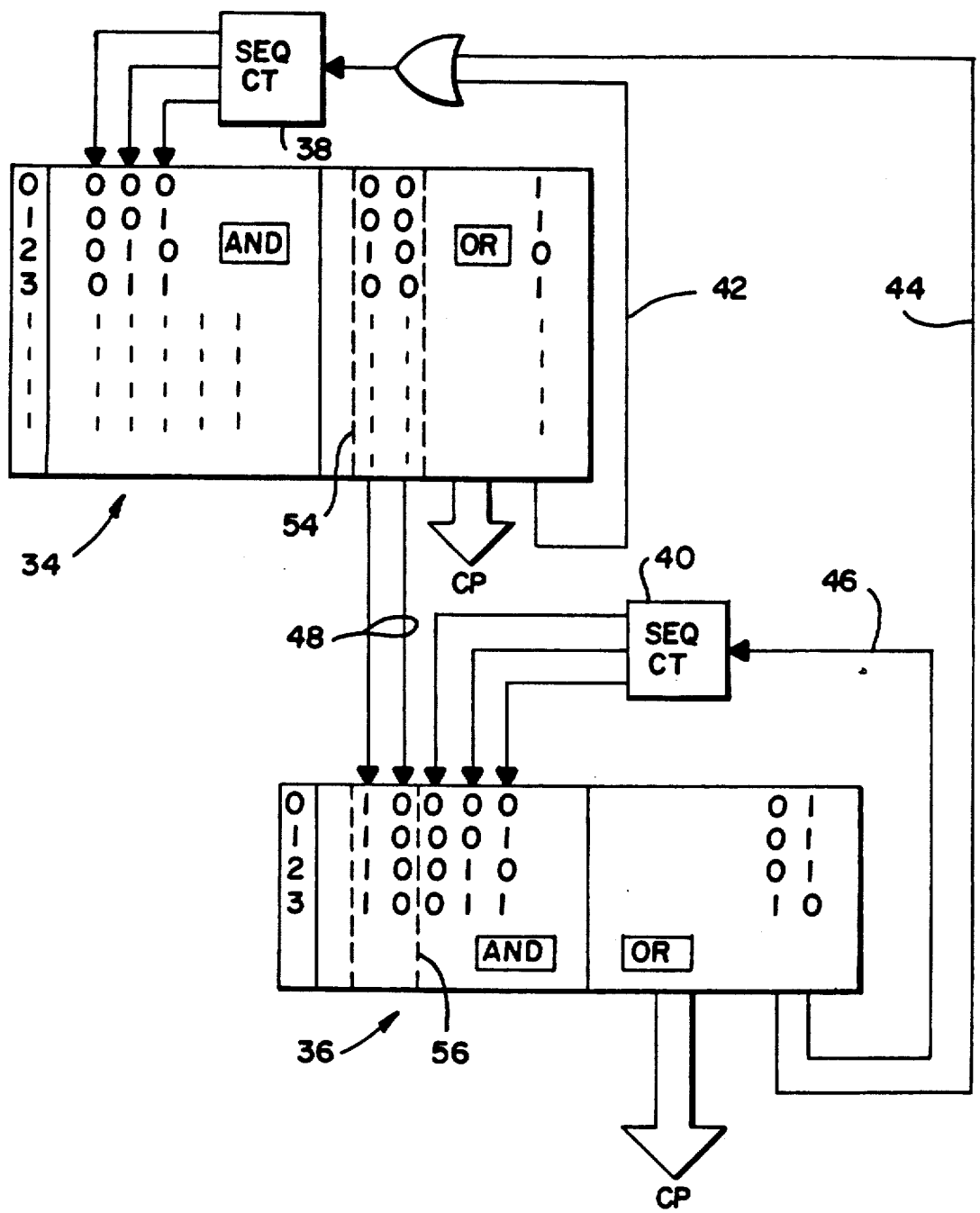
FIG. 3 is a functional block diagram, with the appropriate representative data bits for the different states being shown in the different AND and OR arrays of the mainline and subroutine PLAs, illustrating the operation of the present invention.

The actual subroutine mechanism in the PLA structure is shown in FIG. 3. As shown, the OR array of mainline PLA 34 contains a two bit encode number that is fed, via bus 48, to the AND array of subroutine PLA 36. Although only a two bit encode number field is used, it should be appreciated that an encode number containing as many bits as necessary can also be used, as the encode number field can be expanded to accommodate the additional bits. The encode number field is designated as 54 and 56 in the OR array of mainline PLA 34 and the AND array of subroutine PLA 36, respectively.

For both PLAs 34 and 36, the respective sequence counters 38 and 40 are shown to increment only three bits in the respective AND arrays. As before, a much greater number of data bits can be accommodated in the respective AND arrays.

Focus now on mainline PLA 34. A plurality of states (which can be equated with addresses in the case of a ROS) are located within the AND array (AND partition) of mainline PLA 34. To simplify the discussion, the respective states are referred to as states 0, 1, 2, etc., as shown to left Each of the states is comprised of a set of data bits. For example, state 0 is represented by 000 while state 2 is represented by 010. Each state in the AND array has a corresponding set of data bits in the OR array (OR partition). For this discussion, this set of data bits is comprised of only the bits representative of the encode numbers and an incrementing bit, which is shown as being output to sequence counter 38, by means of line 42. Thus, state 0 is represented as 001 in the OR array of PLA 34.

Although only three data bits are shown in the OR array of mainline PLA 34, it should be appreciated that additional data bits are actually present therein since these additional data bits are needed for generating the control points CP to perform particular functions.

Each state of the AND array of subroutine PLA 36, in addition to the data bits representing the sequence count, further has data bits representing the encode number for subroutine PLA 36 which is limited to two data bits since only two data bits are represented in the OR array of mainline PLA 34. For this discussion, subroutine PLA 36 is shown to have an encode number represented by data bits having values 10. Thus, for each of the states contained within the AND array of subroutine PLA 36, five data bits are shown. For example, state 0 is represented by 10000 while state 2 is represented by 10010. For subroutine PLA 36, the set of data bits in its AND array has a corresponding set of data bits in its OR array.

For the embodiment of FIG. 3, each pair of corresponding set of data bits in the OR array of subroutine PLA 36 is shown to have only two data bits—one being used to increment mainline PLA 34 while the other being used to increment subroutine PLA 36. Like the OR array of mainline PLA 34, the OR array of subroutine PLA 36 also has a plurality of sets of control points, not shown, for performing particular functions.

The embodiment of FIG. 3 operates as follows. Assume that sequence counters 38 and 40 have been reset to 000, i.e. the initial state, and that the operation code (not shown in FIG. 3) has chosen a value of 010 (i.e. state 2) for producing the function it requires. As mainline PLA 34 is sequenced by sequence counter 38, by means of the incrementing control data bit having the value of 1 through line 42, nothing happens during the first two states 0 and 1, as the encode number bits have values of 00. However, when mainline PLA 34 is incremented to state 2 (010), the encode number field has a corresponding set of data bits having the value 10, which as can be seen, corresponds to the data bit values in encode number field 56 in the AND array of subroutine PLA 36. At this point, subroutine PLA 36 is activated. At the same time, the incrementing control data bit in the OR array of mainline PLA 34 (for state 2) has a value of 0. This signifies the effective freezing, or suspension, of operation of mainline PLA 34. In other words, mainline PLA 34 is suspended in state 2, as subroutine PLA 36 takes over the operation. It is important to note, however, that even though mainline PLA 34 is effectively suspended, data bits representing control points for state 2 are still being output from its OR array.

When the value of encode number field 56 of subroutine PLA 36 matches that of encode number field 54 at state 2 (010) of mainline PLA 34, subroutine PLA 36 is incremented, by means of its subroutine sequence counter control point which has a value 1, and carried along line 46 to sequence counter 40. As subroutine PLA 36 sequences through its states, in this instance states 0 to 3, it is, of course, generating control point signals from its OR array for performing specific functions.

When subroutine PLA 36 is incremented to state 3, i.e. location containing 10011, the data bit representing the increment subroutine sequence counter attains a value 0. At the same time, the field in the OR array having the data bit representing the increment mainline sequence counter control point has the value 1. As a result, sequence counter 38 is activated for stepping mainline PLA 34 from state 2 to state 3, i.e. from 010 to 011. Since encode number field 54 for state 3 now has a value 00, subroutine PLA 36 no longer is "addressed." Hence, an automatic branching from subroutine PLA 36 back to mainline PLA 34 is effected. At this point, sequence counter 40 of subroutine PLA 36 can be reset to 0 in order to prepare for the next subroutine entry. Or, alternatively, it can be left as is, or set to some other state, if a particular function is desired when it next operates.

Figure 4:
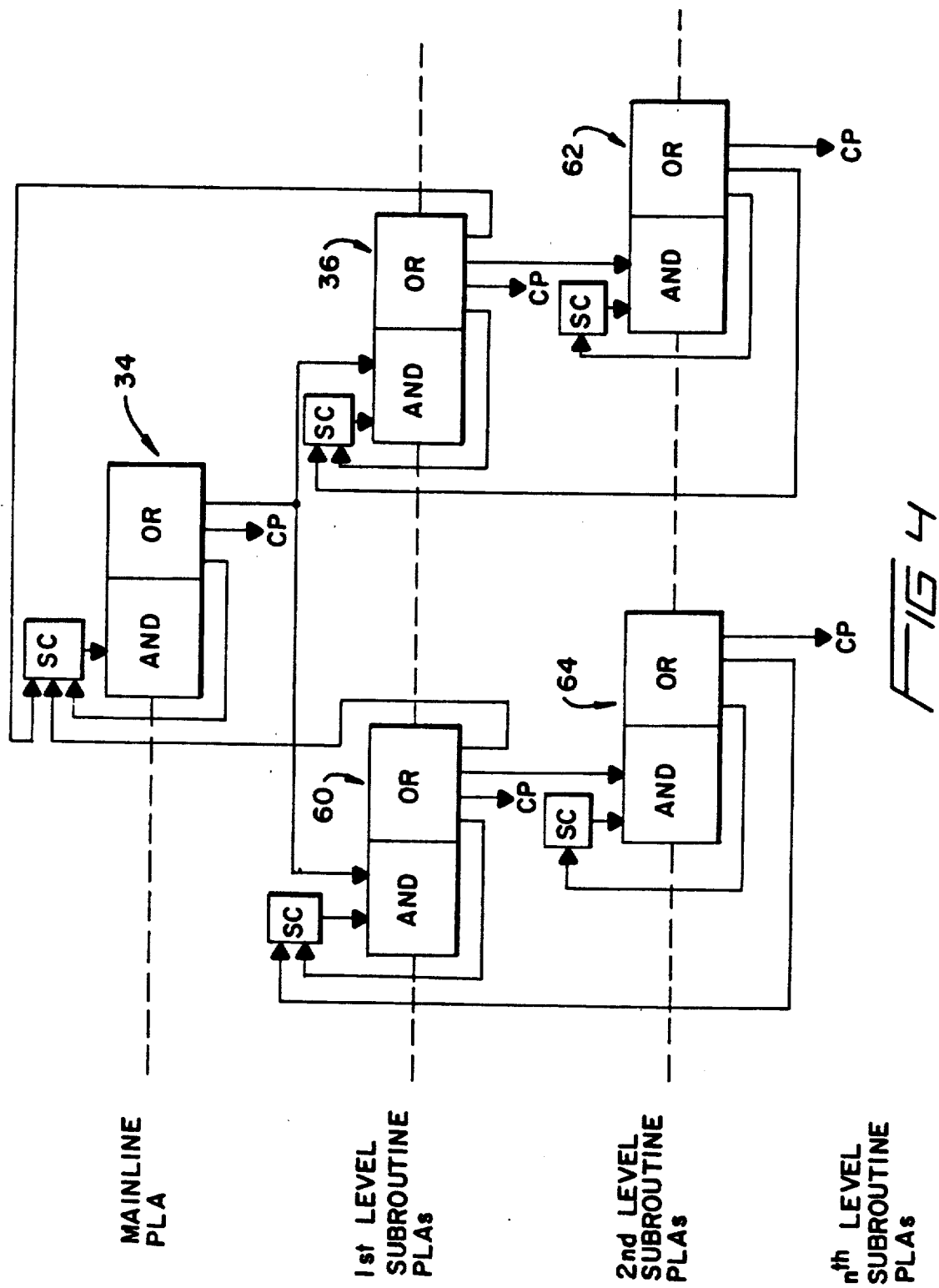
FIG. 4 is a simplified functional block diagram showing the relationship between a mainline PLA and different levels of subroutine PLAs.

When mainline PLA 34 resumes operation, different states are incremented. Accordingly, different subroutine PLAs can also be "addressed." And this is illustrated in FIG. 4 by the interconnections between the mainline PLA and different subroutine PLAs, located at different levels. Although only two separate subroutine PLAs are shown for each of the levels, it should readily be appreciated that a plurality of PLAs can be assigned at each of the different levels.

As shown, the different PLAs can be nested from one level to the next, ad infinitum, as long as the following criteria are followed: each PLA has to have it's own corresponding sequence counter; each PLA must have a control point in its OR array to increment its own sequence counter and must also have a control point to increment the sequence counter of the PLA that feeds it; and each PLA has to have an encode number field in its OR array that is used to form part of an "address" to the PLA that it is feeding, so that when the data bits in the encode number field of the fed PLA match the data bits of the encode number field of the feeding PLA, the fed PLA becomes operative.

For the embodiment of FIG. 4, a plurality of PLAs may become operative at the same time. For example, subroutine PLA 36 and subroutine PLA 60 could be operating at the same time to execute different functions required by the operation code. In fact, subroutine PLA 36 may still be sequencing, and thereby operating, while subroutine PLA 60 may already have been incremented to a state whereby it is suspended and control has been passed on to second level subroutine PLA 64. Note, however, that even though some of PLAs in the embodiment of FIG. 4 may have been "suspended", the expected control point signals from these "suspended" PLAs (which may also include those of mainline PLA 34) can be combined with the control points output from the "operative" PLAs. Thus, unlike the prior art, the present invention allows the simultaneous generation of each microword of a sequence of microwords. And with the feature which allows a fed PLA to automatically branch back to a feeding PLA, flexible and efficient operations result.

For the embodiment shown in FIG. 4, to "unfreeze" mainline PLA 34, only one of the first level subroutine PLAs has to have been incremented to the state whereby its data bit representing the control point for incrementing the mainline sequence counter becomes active. Putting it differently, only one of the first level subroutine PLAs has to finish its work before mainline PLA 34 is again incremented. By means of programming, however, this sequence of events may actually be altered to require all of the first level subroutine PLAs to finish their respective functions before the operation of the mainline PLA is reinstated. Alternatively, the reinitializing of the incrementation of the mainline PLA may be contingent on the last first level subroutine PLA to finish its function.

For reliable operation whereby a hazard free environment, i.e. no logical race conditions, exists during the time the PLAs are incrementing, a double latch "Level Sensitive Scan Design" (LSSD) mechanism may be used.

Figure 5:
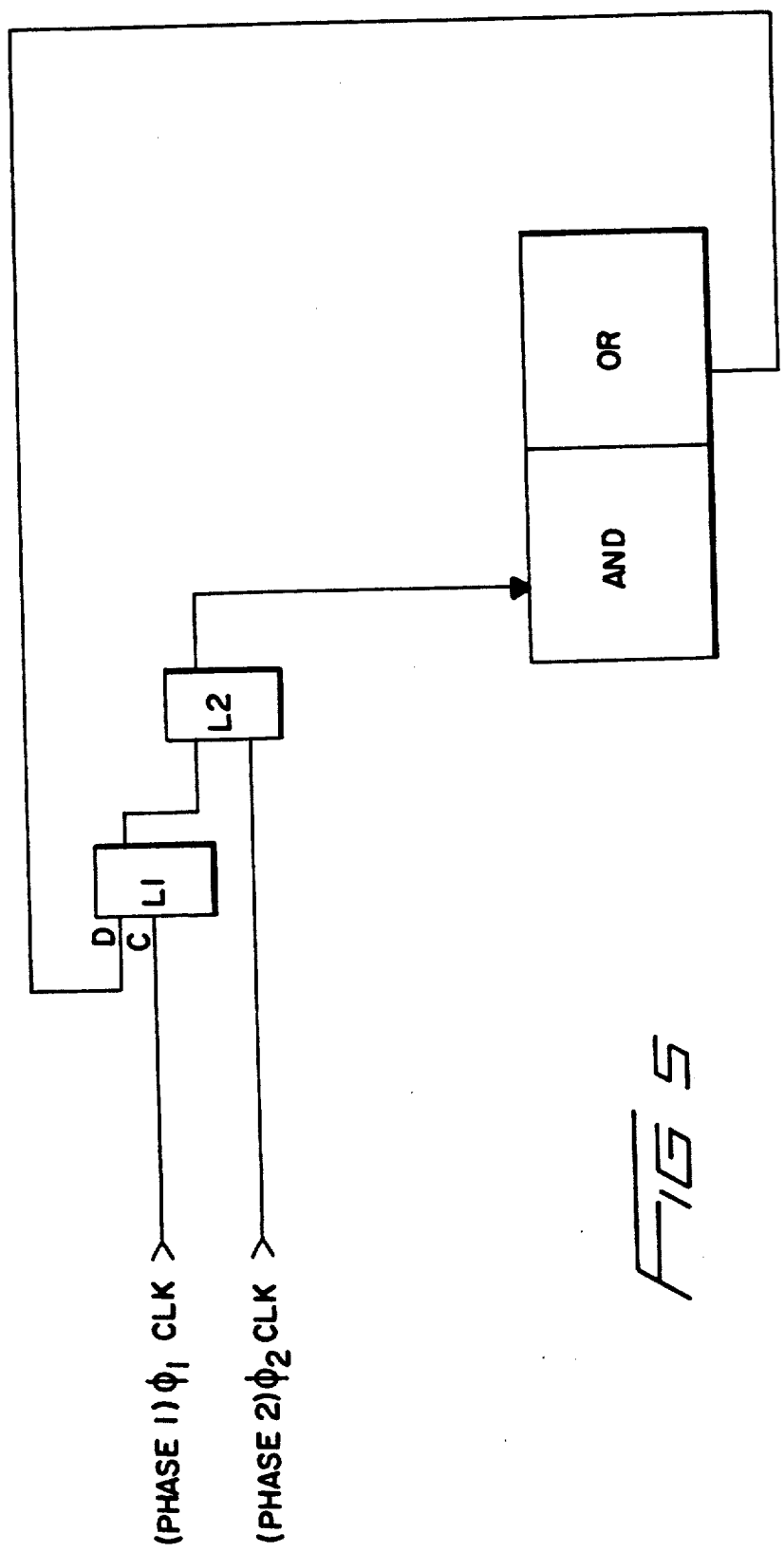
FIG. 5 illustrates a double latch mechanism used for enhancing the operation of PLAs in accordance with the present invention.

In essence, with reference to FIG. 5, a LSSD mechanism uses two latches L1 and L2 which together represent one bit of a sequence counter. An output from the OR array (of the feeding PLA) is latched into the L1 latch via a "$\Phi_1$" clock. A subsequent "$\Phi_2$" clock transfers the latch information from latch L1 to L2, thereby causing a change in the output of the OR array, which is again latched into the L1 latch. Thus, the output of the OR array can actually be clocked while the particular data is read out, even though the address (state) has been incremented. Putting it differently, the data bit values of the state will not be changed until "$\Phi_2$" clock comes along. Of course, the "$\Phi_1$" clock and the "$\Phi_2$" clock are two mutually exclusive clocks and are separated by an increment of time for providing this so-called "non-overlaying mode", which is necessary inasmuch as it is desirable to insure that no logical race conditions occur as the feeding PLA is being incremented by a control point from a fed subroutine PLA.

Figure 6:
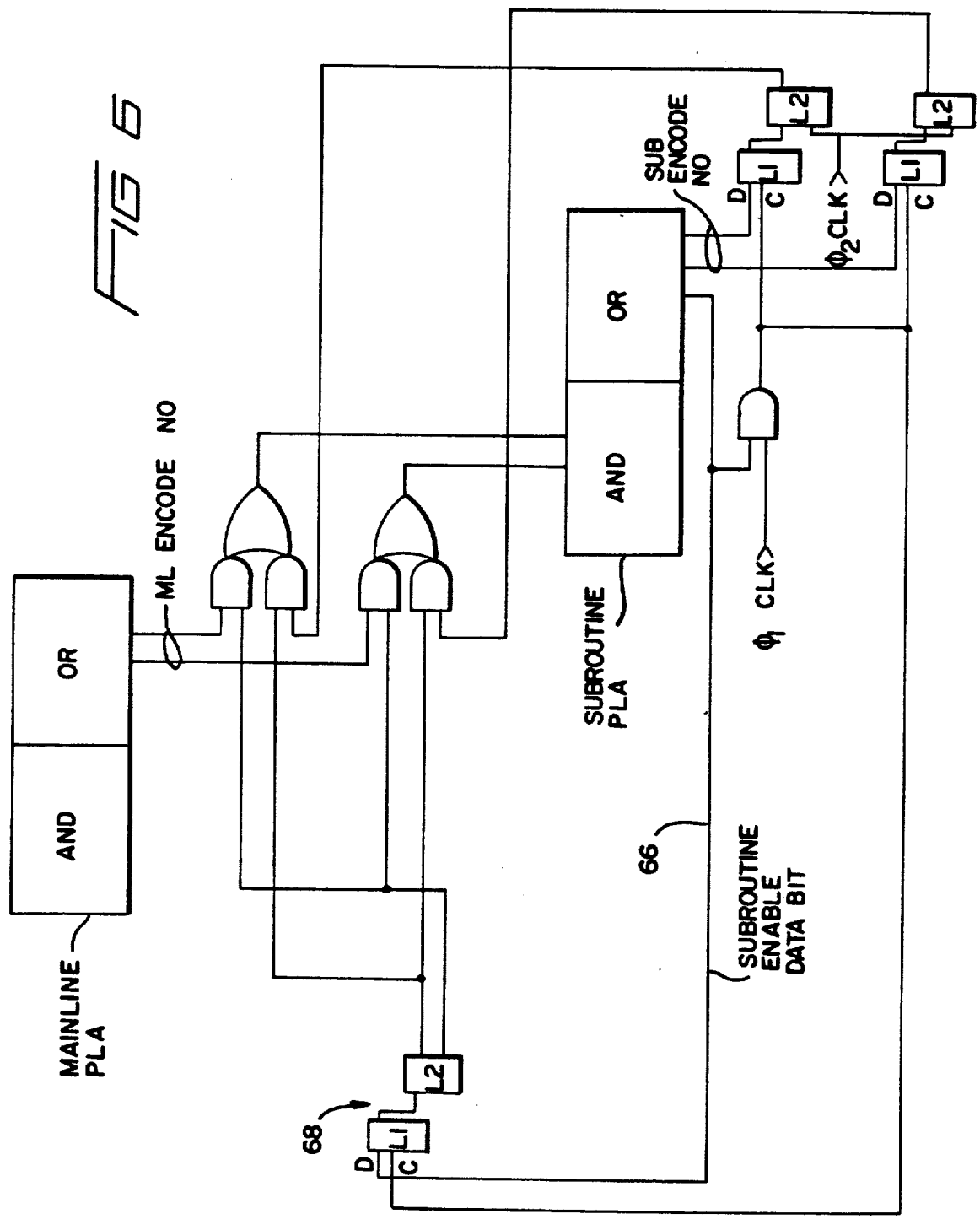
FIG. 6 is a functional partial schematic block diagram showing a recursively operating subroutine PLA.

FIG. 6 illustrates an arrangement whereby a subroutine PLA can recursively operate. This is accomplished by including a subroutine encode number field in the OR array of the subroutine PLA. For example, a data bit representing the subroutine enable data bit may be fed from line 66 to latches 68 for gating with the data bits from the encode number field of the feeding PLA which, in the embodiment of FIG. 6, is shown as a mainline PLA. The subroutine enable data bit field can be shared with an existing control field if the function that it is to be shared with is mutually exclusive. As can be seen, a small amount of control logic is required in order to distinguish the logical meaning of this field on a time-share basis. For hazard free operation, a plurality of latching arrangements as shown in FIG. 5 have been incorporated into the embodiment of FIG. 6.

For the sake of clarity, as the operations of the respective sequence counters are the same as previously discussed, the sequence counter controls are not shown. By using this recursive arrangement, an automatic branching to different places within the same physical subroutine PLA can be effected. Also, this recursive arrangement is desirable inasmuch as a particular function has to be repeated a number of times. To end the recursive operation, the subroutine enabled data bit is given a non-enabling value.

Inasmuch as the present invention is subject to many variations, modifications and changes in detail, it is intended that all matter described throughout this specification and shown in the accompanying drawings be interpreted as demonstrative only and not in a limiting sense. Accordingly, it is intended that the invention be limited only by the spirit and scope of the appended claims.

We claim:

1. In a data processor wherein microwords are used to execute processor instructions, a microcode control apparatus comprising:
   a programmable logic array circuit having:
   one partition containing a plurality of states for receiving an operation code of a processor instruction, at least one of the states being selectable by said operation code;
   another partition containing a plurality of sets of function signals and encode signals each corresponding to one of the state present in said one partition;
   first means working cooperatively with said programmable logic array circuit for sequencing the states of said one partition until one of the states is selected by said operation code;
   at least one other programmable logic array circuit having:
   an input partition containing a plurality of states and a predetermined encode signal for receiving said encode signals from said another partition of said programmable logic array circuit;
   an output partition containing a plurality of function signals each corresponding to one of the states present in said input partition, said output partition further including at least one control signal having either a first or a second value one of which effects said first means to reinitialize sequencing of said programmable loci array circuit, said at least one control signal being incremented in cooperative association with said plurality of states;
   second means working cooperatively with said other programmable logic array circuit for sequencing the states of said input partition and the corresponding function signals in said output partition when the encode signal corresponding to said state selected by said operation code in said another partition of said programmable logic array circuit matches said predetermined encode signal in said input partition of said other programmable logic array circuit;
   wherein said output partition outputs one function signal corresponding to each state of said input partition to effect, either by itself or with other function signals, a function associated with said operation code as said each state of said input partition is being sequenced, said output partition continuously outputting function signals associated with said operation code as long as said control signal remains at the value not effective to reinitialize sequencing of said programmable logic array circuit.

2. The apparatus of claim 1, wherein said output partition of said other programmable logic array circuit further comprises another control signal whose value is opposite that of said control signal for effecting said second means to increment the states of said other programmable logic array circuit, the respective values of said control signal and said another control signal being mutually exclusive of each other so that opposite values are provided to said another partition and said output partition at any one time.

3. The apparatus of claim 1, wherein said another partition of said programmable logic array circuit further comprises a control signal having either a first or a second value one of which being effective for causing said first means to increment the states of said one partition.

4. The apparatus of claim 1, wherein said functions and encode signals of said one partition of said programmable logic array circuit comprise data bits, said encode data bits locating within an encode field in said another partition of said programmable logic array circuit; and
   wherein said predetermined encode signal comprises data bits located within an encode field in said input partition of said other programmable logic array circuit, said respective encode fields in said one partition and said input partition having the same number of data bits.

5. The apparatus of claim 3, wherein said first and second sequencing means each comprise a sequence counter;
   wherein said sequence counter of said programmable logic array circuit has as input thereto a combination of said control signal from said another partition of said programmable logic array circuit and said control signal from said output partition of said other programmable logic array circuit; and
   wherein said sequence counter of said other programmable logic array circuit has as input thereto said another control signal from said output partition of said other programmable logic array circuit.

6. The apparatus of claim 1, further comprising:
   at least one addition programmable logic array circuit working in cooperation with either said programmable logic array circuit or said other programmable logic array circuit, said addition programmable logic array circuit including:
   a first partition containing a plurality of states and a predetermined encode signal for receiving said encode signals from either said another partition of said programmable logic array circuit or encode signals from said output partition of said other programmable logic array circuit;
   a second partition containing a plurality of function signals each corresponding to one of the states present in said first partition, said second partition further including a control signal having either a first or a second value one of which effects either said first means or second means to reinitialize sequencing of corresponding said programmable logic array circuit or other programmable logic array circuit;
   third means working cooperatively with said additional programmable logic array circuit for sequencing the states of said first partition and the corresponding function signals in said second partition of said additional programmable logic array circuit when the encode signal corresponding to the state selected by said operation code in either said another partition of said programmable logic array circuit or said output partition of said other programmable logic array circuit matches said predetermined encode signal.

7. The apparatus of claim 5, further comprising:
latching means working cooperatively with said sequence counters to ensure a hazard free environment whereby no logical race conditions exist during the time when said respective programmable logic array circuits are sequencing.

8. In a data processor wherein microwords are used to execute processor instructions, a microcode control apparatus comprising;
a mainline PLA having:
a first array including a plurality of addresses for receiving an operation code of a processor instruction, one of said addresses to be selected by said operation code;
a second array including at least a control signal and an encode field having at least two encode signals;
sequence means working cooperatively with said mainline PLA to incrementally address said first array until one of said addresses is selected by said operation code, at which time the addressing of said mainline PLA is suspended;
at least one subroutine PLA having:
an input array including a plurality of addresses and an encode field having a predetermined encode signal for receiving said encode signals from said second array of said mainline PLA;
sequence means working cooperatively with said subroutine PLA to begin incrementally addressing said input array when the encode signal from said second array of said mainline PLA matches said predetermined encode signal of said input array;
said substrate PLA further having:
an output array having first and second control signals and a plurality of function signals each corresponding to one of said addresses of said input array, said first and second control signals each having either one of two different values, and the respective values of said first and second control signals being different at all times, said first control signal being fed to said mainline PLA sequence means and said second control signal being fed to said subroutine PLA sequence means, said input array of said subroutine PLA being incrementally addressed when said second control signal has one of said different values, said output array of said subroutine PLA outputting one of said function signals corresponding to the address of said input array being incremented to effect, either by itself or with other function signals, a function representative of said operation code, said addresses of said input array continuously being incremented by said subroutine PLA sequence means until the value of said second control signal no longer has said one of said different values, at which time said first control signal has said one of said different values and is effective to cause said mainline PLA sequence means to begin incrementally addressing said first array of said mainline PLA to thereby reinitialize operation of said mainline PLA.

9. The apparatus of claim 8, further comprising:
another subroutine PLA associated with either said mainline PLA or said subroutine PLA, said another subroutine PLA having:
an AND array including a plurality of addresses and an encode field having a predetermined encode signal for receiving encode signals from either said mainline PLA or said subroutine PLA;
an OR array having first and second control signals and a plurality of function signals each corresponding to one of the addresses of said AND array;
sequence means associated with said another subroutine PLA to begin incrementally addressing said AND array when an encode signal from either said first array of said mainline PLA or said input array of said subroutine PLA matches said predetermined encode signal in said encode field of said AND array, the addressing of either or both of said mainline PLA and said subroutine PLA being suspended when said AND array of said another subroutine PLA is incrementally addressed;
wherein said first and second control signals of said OR array each have either one of two different values, and the respective values of said first and second control signals of said OR array being different at all times, said first control signal of said OR array being fed to ether said mainline PLA sequence means or said subroutine PLA sequence means, and said second control signal being fed to said another subroutine PLA sequence means, said AND array of said another subroutine PLA being incrementally addressed when said second control signal has one of said different values, said OR array of said another subroutine PLA outputting one of said function signals corresponding to the address of said AND array being incremented to effect, either by itself or with other function signals, a function representative of said operation code, said addresses of said AND array continuously being incremented by said another subroutine PLA sequence means until the value of said second control signal no longer has said one of said different values, at which time said first control signal has said one of said different values and is provided to either said first array of said mainline PLA or said input array of said subroutine PLA to begin incrementally address, and thereby reinitialize operation of, either or both of said first array of said mainline PLA and said input array of said subroutine PLA.

10. The apparatus of claim 8, wherein said function and encode signals of said second array of said mainline PLA comprise data bits; and
wherein said predetermined encode signal of said input array of said subroutine PLA comprises data bits, said respective encode signals in said second array of said mainline PLA and said input array of said subroutlne PLA having the same number of data bits.

11. The apparatus of claim 8, wherein said mainline PLA sequence means and said subroutine PLA sequence means each comprise a sequence counter;
wherein said mainline PLA sequence counter has input thereto a combination of said control signal from said second array of said mainline PLA and said control signal from said output array of said subroutine PLA; and
wherein said sequence counter of said subroutine PLA has input thereto said second control signal from said output array of said subroutine PLA.

12. The apparatus of claim 11, further comprising:
latching means working cooperatively with said sequence counters to ensure a hazard free environment whereby no logical race conditions exist during the time when said respective mainline and subroutine PLAs are sequencing.

13. A method of operating a microword processor comprising the steps of:
    configuring a plurality of addresses in a first array, and a corresponding number of encode signals and at least one control signal in a second array of a mainline PLA;
    configuring a predetermined encode signal and a plurality of addresses in an input array, and a corresponding number of function signals and at least a first and second control signal in an output array of at least one subroutine PLA;
    sending an operation code of a processor instruction to said first array of said mainline PLA;
    utilizing a first sequence means to incrementally address said first array until one of said addresses corresponds to said operation code;
    comparing the encode signal in said second array of said mainline PLA corresponding to said one address corresponding to said operation code with said predetermined encode signal in said input array of said subroutine PLA;
    suspending addressing of said mainline PLA if the encode signal of said mainline PLA matches said predetermined encode signal of said subroutine PLA;
    providing said first control signal having an incrementing value from said output array to said input array of said subroutine PLA if said respective encode signals match;
    utilizing a second sequence means to begin incrementally addressing said input array of said subroutine PLA upon receiving said first control signal having said incrementing value;
    outputting from said output array of said subroutine PLA a function signal for each of said addresses being addressed in said input array to perform a function representative of said operation code; and
    continuously outputting a function signal corresponding to each of said addresses being addressed from said output array of said subroutine PLA until said first control signal provided from said output array to said input array of said subroutine PLA no longer has said incrementing value.

14. The method of claim 13, further comprising the steps of:
    configuring said first and second control signals to have mutually exclusive values so that each of said first and second control signals in said output array of said subroutine PLA has, at any time, a value opposite to the other control signal, one of said mutually exclusive values being said incrementing value and the other of said mutually exclusive values being non-incrementing value;
    suspending addressing of said subroutine PLA when said first control signal has said non-incrementing value; and
    providing said second control signal having said incrementing value to said first sequence means to reinitialize addressing said first array of said mainline PLA.

15. The method of claim 14, further comprising the step of:
    combining the being output function signal corresponding to the address being addressed and the being output function signal corresponding to the address not being addressed in either of said second array of said mainline PLA or said output array of said subroutine PLA to perform the function required by said operation code.

* * * * *